United States Patent Office 3,504,669
Patented Apr. 7, 1970

3,504,669
COMBINED DIVING DEVICE AND ELECTROLYSIS OPERATED OXYGEN GENERATOR
David Albert, 19 Beverly Road,
New Rochelle, N.Y. 10804
Filed Sept. 7, 1967, Ser. No. 666,050
Int. Cl. A62b 7/02; B01j 7/00
U.S. Cl. 128—142                               8 Claims

ABSTRACT OF THE DISCLOSURE

This specification discloses apparatus for breathing under water. It includes an oxygen generator that uses a current of electricity to decompose the water into oxygen and hydrogen; and the oxygen is supplied to a mask or helmet worn by the diver. When used with sea water, there are filters for removing unwanted gases from the oxygen. The electric current is supplied by a battery worn by the diver for short dives and is supplied through a conductor from a boat for long dives. The oxygen generator is preferably a part of the suit worn by the diver with a pocket into which water enters between the electrodes of the generator. Wire gauze electrodes permit the suit to be flexible. The rate of generation of oxygen is adjustable automatically by the pressure in the oxygen generator pushing water out of the pocket and reducing the wetted area of the electrodes.

SUMMARY OF THE INVENTION

This invention provides apparatus for generating oxygen by decomposition of water taken from that surrounding a diver and the oxygen is suppled to the mask or helmet worn by the diver. The water is subjected to the flow of electric current between electrodes in a chamber which is preferably a pocket of a wet suit or other apparel worn by the diver.

The electrodes of the electrolysis oxygen generator are preferably made of wire gauze so as not to interfere with the flexibility of the suit. The areas of the electrodes are coordinated with the current flow so as to produce a maximum amount of oxygen needed by the diver when active; and the rate of oxygen production is reduced by reducing the wetted areas of the electrodes.

When batteries are used for the source of electricity, they may be worn on a "weight belt" and they leave the diver free to move about without regard to any surface ship. He has the same freedom of locomotion as with "scuba" diving equipment. For long dives, where it is not practical to carry batteries of sufficient capacity for the period of immersion, an insulated conductor can be connected with the oxygen generator and supplied with electric power from a ship.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DETAILED DESCRIPTION OF THE INVENTION

Figure 1:
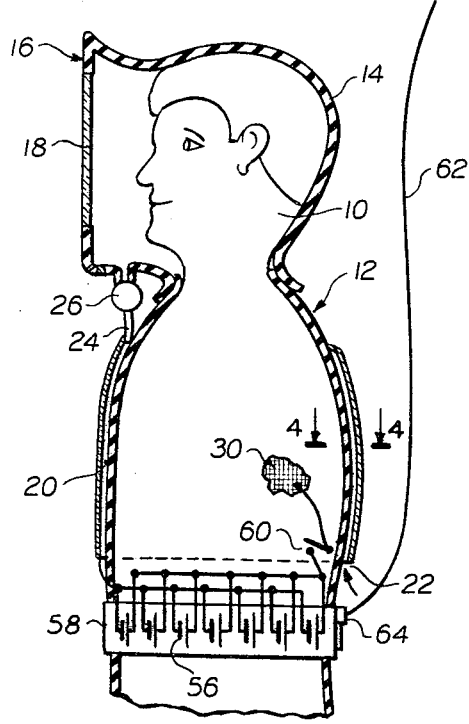
FIGURE 1 is a diagrammatic view showing a diver wearing oxygen generating and breathing equipment made in accordance with this invention.

FIGURE 1 shows a diver 10 wearing a wet suit 12 having a helmet 14 with a mask 16 equipped with the usual window 18. The portion of the suit 12 between the shoulders and the waist of the diver is made with a double thickness which forms a pocket 20 extending around the chest, sides and back of the diver.

This pocket 20 is constructed so that the walls are stiff enough normally to remain spaced from one another so that water will enter the pocket from the lower end 22. The upper end of the pocket 20 is closed; but as long as gas can escape from the upper end of the pocket 20, water will flow into the bottom opening 22 and fill the pocket to the height permitted by the gas already in the upper part of the pocket.

When the water pressure surrounding the diver is equal to the gas pressure in the upper part of the pocket 20, the level of the water rises no higher. The bottom opening 22 preferably extends around the entire circumference of the pocket 20. Gas from the upper end of the pocket 20 flows through a pipe 24 which communicates with the interior of the mask 16. There is a filter 26 located in the pipe 24 for removing objectionable by-products which are generated at the oxygen electrode when using the apparatus in sea water.

Figure 2:
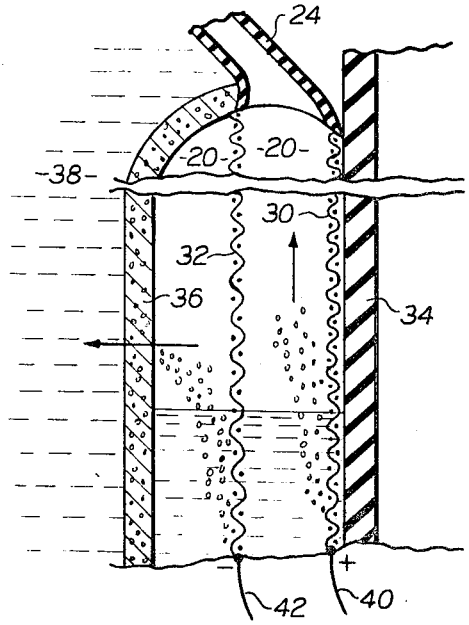
FIGURE 2 a greatly enlarged fragmentary sectional view through the upper part of the oxygen generator shown in FIGURE 1.

FIGURE 2 shows the upper part of the front portion of the pocket 20 on an enlarged scale. It contains two electrodes 30 and 32. The electrode 30 is preferably attached to the inside wall of the pocket 20, designated in FIGURE 2 by the reference character 34. The electrode 32 is at a mid portion between the inner wall 34 and the outer wall of the pocket 20, designated in FIGURE 2 by the reference character 36. This outer wall is preferably made of material which prevents water from entering the pocket 20 but which permits the escape of hydrogen into the water 38 which surrounds the diver.

The electrode 30 is connected with an electrical conductor 40 and the electrode 32 is connected with an electrical conductor 42 of opposite polarity from the conductor 40. The polarity is arranged so as to cause the oxygen to accumulate in the electrode 30 and the hydrogen to accumulate in the electrode 32. Both of the electrodes 30 and 32 are preferably made of wire gauze. This has the advantage of leaving the suit flexible; and it also has the advantage that the hydrogen can be forced through the electrode 32 by the oxygen pressure so that little or no hydrogen flows upward into the pipe 24 which communicates with the pocket 20 between the electrodes 30 and 32.

Figure 3:
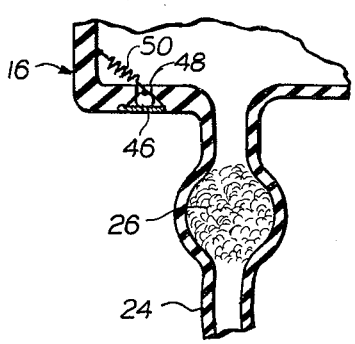
FIGURE 3 is a greatly enlarged, fragmentary, sectional view of a portion of the mask.
Figure 4:
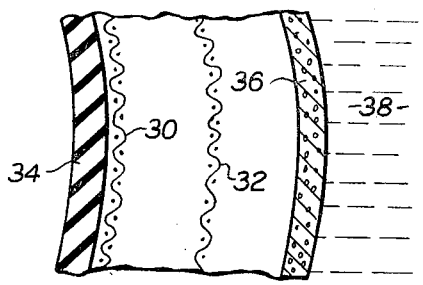
FIGURE 4 is a sectional view on the line 4—4 of FIGURE 1.

The mask 16 is equipped with an exhaust valve 46 (FIGURE 3) located at a gas outlet 48. This exhaust valve 46 is loaded with a light spring 50 for holding the valve 46 in closed position. A slight increase in the pressure in the mask 16, caused by exhaling of the diver, causes some of the gas from the mask to flow out through the exhaust passage 48. This exhaust outlet is located in the part of the mask where the concentration of exhaled air is the highest; but the mask has substantial volume in front of the diver's face and provides for a substantial amount of rebreathing. Various arrangements for inhaling and exhaling the breathing atmosphere can be used, in accordance with practices well understood in the art.

The electricity for the conductors 40 and 42, which supply the electrodes 30 and 32, is provided by batteries 56 (FIGURE 1). These batteries are on a belt 58 worn by the diver around his waist, and they serve as a weight belt. A master switch 60 can be operated manually to shut off the power supply when desired. A conductor 62 can be plugged into a receptacle 64 on the diver's belt for supplying electricity to the oxygen generating equipment as a substitute for the batteries, or as an auxiliary supply of current.

As the amount of oxygen within the pocket 20 increases, the pressure of the oxygen increases and forces the water level downwardly in the pocket 20. This leaves the upper portions of the electrodes 30 and 32 without contact with the water, and the reduction in wetted area of the electrodes 30 and 32 reduces the generation of oxygen so that a condition is left where the rate of generation of the oxygen equals the rate at which the oxygen is used.

The preferred embodiment of the invention has been illustrated and described, but changes and modifications can be made and some features can be used in different combinations without departing from the invention as defined in the claims.

What is claimed is:

1. Underwater breathing apparatus including a face mask for supplying oxygen to a diver, an electrolysis oxygen generator that is worn by the diver, a water chamber within the oxygen generator containing an electrode at which oxygen is generated when current flows through water in the chamber, a passage connecting the face mask with a part of the water chamber in which oxygen accumulates, another passage through which water surrounding the diver flows into the water chamber, and means for supplying electricity to the oxygen generator.

2. The underwater breathing apparatus described in claim 1 characterized by a filter chamber in a part of the passage from the oxygen generator to the face mask, and filter means in the filter chamber for removing impurities from the oxygen that flows through said passage toward the mask.

3. The underwater breathing apparatus described in claim 1 characterized by the oxygen generator being flexible so that it can lie against and pass around at least a portion of the circumference of the diver's body, the chamber in the oxygen generator having flexible electrodes, one for the accumulation of oxygen and the other for hydrogen accumulation, and the hydrogen electrode being porous for the escape of hydrogen from the chamber between the electrodes.

4. The underwater breathing apparatus described in claim 3 characterized by the electrodes having substantial vertical extent and the water chamber having an opening at its lower end of the entrance of water into the water chamber, the level of water and the resulting immersed areas of the electrodes being dependent upon the gas pressure in the water chamber and the pressure of the ambient water surrounding the diver.

5. The underwater breathing apparatus described in claim 1 characterized by a suit worn by the diver, the oxygen generator being an integral part of the suit and the water chamber of the oxygen generator being a pocket of the suit.

6. The underwater breathing apparatus described in claim 1 characterized by a belt worn by the diver, said means for supplying electricity comprising batteries on the belt and connected with the electrodes in the water chamber for supplying current to the electrodes.

7. The underwater breathing apparatus described in claim 1, said means for supplying electricity comprising an electrical conductor connected with the oxygen generator for leading to a source of electricity located above the surface of the water or at any other location remote from the diver.

8. The underwater breathing apparatus described in claim 1 characterized by a swim suit for a diver, the oxygen generator being a portion of the swim suit and the water chamber being a pocket of the swim suit with the upper end of the pocket communicating with the passage to the face mask, the oxygen electrode being made of wire gauze and being against the inside wall of the pocket, and another wire gauze electrode of the generator for hydrogen, the pocket having a space on the side of the hydrogen electrode that is away from the oxygen electrode and into which the hydrogen is repelled by the charge of the oxygen electrode and by the pressure of the oxygen gas, and means through which the hydrogen escapes into the ambient water surrounding the diver.

References Cited

UNITED STATES PATENTS

| | | | |
|---|---|---|---|
| 596,936 | 1/1898 | Irving | 128—190 |
| 1,000,721 | 8/1911 | Cypra | 128—142.3 |
| 3,228,394 | 1/1966 | Ayres | 128—142 |
| 3,318,306 | 5/1967 | Strauss | 128—147 |
| 3,333,583 | 8/1967 | Bodell | 128—142 |
| 3,410,778 | 11/1968 | Krasberg | 128—142 X |

ANTON O. OECHSLE, Primary Examiner

T. ZACK, Assistant Examiner

U.S. Cl. X.R.

23—281; 128—142.5, 142.6